No. 621,203. Patented Mar. 14, 1899.
L. BALLBACH.
ATTACHMENT FOR MEAT CUTTING MACHINES.
(Application filed Feb. 26, 1898.)
(No Model.)

Witnesses
A. L. Hobby

Inventor
Louis Ballbach
By Thos. S. Sprague & Son
Attys.

UNITED STATES PATENT OFFICE.

LOUIS BALLBACH, OF DETROIT, MICHIGAN.

ATTACHMENT FOR MEAT-CUTTING MACHINES.

SPECIFICATION forming part of Letters Patent No. 621,203, dated March 14, 1899.

Application filed February 26, 1898. Serial No. 671,720. (No model.)

*To all whom it may concern:*

Be it known that I, LOUIS BALLBACH, a citizen of the United States, residing at Detroit, in the county of Wayne and State of Michigan, have invented certain new and useful Improvements in Attachments for Meat-Cutting Machines, of which the following is a specification, reference being had therein to the accompanying drawings.

This invention is designed to form an attachment to the well-known form of meat-cutting machine described in United States Letters Patent No. 339,834; and the primary object of the invention is to adapt said machine for mixing the meat after it is chopped; and to this end the invention consists in a simple attachment adapted to be combined with the casing and feed-screw of said meat-cutter, and thereby convert the same into an efficient mixing-machine which not only serves the immediate purpose of mixing the meat after it has been chopped by the machine, but serves a variety of other uses in mixing various articles of food, and thereby greatly facilitating the work of the cook at very little additional expense.

Figure 1:
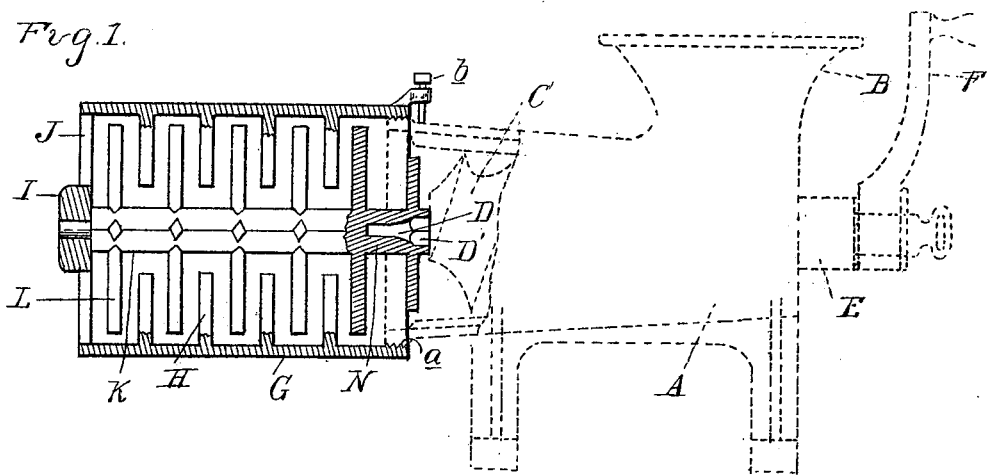
Figure 2:
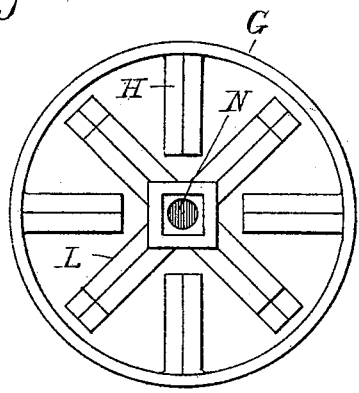
Figure 3:
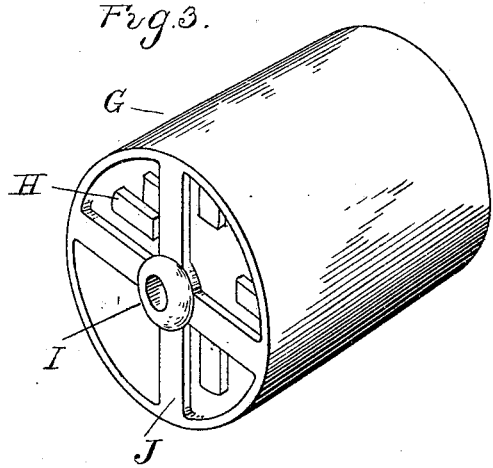
Figure 4:
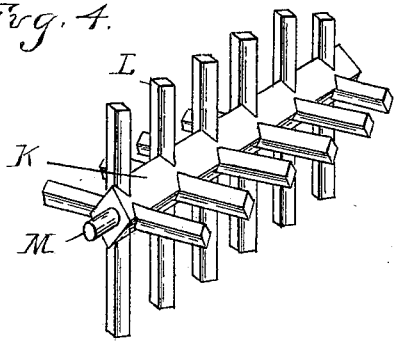

In the drawings, Figure 1 shows my attachment as arranged in operative connection with certain parts of the meat-cutter. Fig. 2 is an end elevation of the attachment. Fig. 3 is a detached perspective view of the casing of the attachment. Fig. 4 is a detached perspective view of the mixing-blades.

The dotted lines in Fig. 1 of the drawings represent that portion of the meat-cutter with which my attachment combines. It comprises the casing A, the hopper B, the feed-screw C, journaled in the bearing E and provided with the handle F, and the journal-bearing D at the rear end of the feed-screw and having a squared portion D'. There are therefore parts (not shown) to be removed from the complete machine. These are the perforated cap, which is screwed onto the rear end of the casing and has a central bearing for the journal D, and the chopping-knife, which is loosely carried upon the squared portion D'.

My attachment comprises a cylindrical casing G, which has at its front end an interior screw-thread adapted to engage with the screw-thread $a$ on the casing A for attaching the casing G thereto. Interiorly the casing G is provided with a number of radial arms H, and at its rear end it has a central bearing I, supported by one or more cross-bars J, all preferably cast integral with the casing. Within this casing is a shaft K, provided with radial arms L, preferably of diamond-shaped cross-section and having at one end a journal M, adapted to engage in the bearing I, and at the other end a socket N, adapted to receive the journal D and its square-shaped portion D'. The arms L are arranged with their diagonals transverse to the axis of the shaft.

In practice in applying my attachment to a meat-cutter of the kind referred to the latter is first put into the condition shown by removing the perforated cap, which is screwed in the casing A, and the chopping-knife, which is loosely sleeved upon the portion D'. Then the cylinder G is secured to the casing A by engaging it with the screw-thread $a$ thereon and at the same time causing the socket N of the shaft K to slip onto the journal D and squared portion D' thereof. The cylinder is then fastened from turning by tightening a set-screw $b$, passing through a threaded projection on the cylinder. It is then ready for operation by feeding the material to be mixed into the hopper B and turning the crank F. In this operation the feed-screw C will carry the material into the cylinder G, where it will be thoroughly mixed by the action of the arms L, which revolve in the interstices between the fixed arms H. By the pressure of the feed-screw the material will be gradually expelled if it is fed in sufficient quantity into the apparatus of itself. However, my attachment would not expel it, and this is done for the very purpose to leave it entirely within the control of the operator to discharge his material when he considers it sufficiently mixed, and when he does want it to be discharged he feeds in fresh material, or if the work is completed he may remove the remaining portion by tilting the apparatus so that the cylinder G is inclined toward the discharge end.

My attachment gives additional value to the meat-cutter, for after the meat has been chopped by its use it can be quickly converted to be used for mixing it, as required for preparing various dishes.

What I claim as my invention is—

1. A mixing attachment for meat-cutters comprising the cylinder or casing G, means for securing the cylinder to the meat-cutter, arms H integral with said cylinder and projecting inwardly therefrom, and a series of radial arms mounted on a shaft in said cylinder and adapted to rotate in the spaces between the arms H on the cylinder, substantially as described.

2. A mixing attachment for meat-cutters comprising the cylinder or casing G, means for attaching the cylinder to the meat-cutter and a locking-screw for preventing the same from turning, working in a threaded projection on the cylinder, arms H projecting from the interior of the cylinder, and a series of arms L, adapted to rotate within the spaces between said arms H, substantially as described.

3. A mixing attachment for meat-cutters comprising a cylinder or casing, arms on the interior thereof, mounted on a shaft adapted to revolve in the casing, means for securing the shaft to the casing at one end thereof, a socket at the opposite end of the shaft adapted to engage with a nut or projection on the feed-screw of the meat-cutter, and means for adjustably securing the attachment to the meat-cutter, substantially as described.

4. A mixing attachment for meat-cutters comprising the cylinder-casing G, means for attaching the same to the meat-cutter, arms H projecting from the interior of said cylinder, a shaft mounted centrally of the casing, connection between said shaft and the cutting-screw of the meat-cutter, and diamond-shaped arms L on the shaft adapted to revolve therewith and project into the spaces between the first-mentioned arms, the arms L being arranged with their diagonals transverse to the axis of the shaft, substantially as described.

5. A mixing attachment for meat-cutters comprising the cylinder G, means for detachably securing the cylinder to the meat-cutter, arms H integral with said cylinder and projecting in series inwardly therefrom, a shaft adapted to revolve in the casing, a loose detachable bearing between one end of said shaft and the screw of the meat-cutter, and a series of radial arms on said shaft adapted to rotate in the spaces between the arms on the cylinder, substantially as described.

In testimony whereof I affix my signature in presence of two witnesses.

LOUIS BALLBACH.

Witnesses:
M. B. O'DOGHERTY,
OTTO F. BARTHEL.